United States Patent
Noone

(10) Patent No.: US 9,412,246 B2
(45) Date of Patent: Aug. 9, 2016

(54) SYSTEMS AND METHODS FOR INTRA-ZONE DETECTION

(71) Applicant: David R. Noone, Delray Beach, FL (US)

(72) Inventor: David R. Noone, Delray Beach, FL (US)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 94 days.

(21) Appl. No.: 14/503,471

(22) Filed: Oct. 1, 2014

(65) Prior Publication Data

US 2016/0098907 A1 Apr. 7, 2016

(51) Int. Cl.
| | |
|---|---|
| G08B 13/00 | (2006.01) |
| G08B 13/24 | (2006.01) |
| G08B 13/183 | (2006.01) |
| G01V 8/20 | (2006.01) |
| G01V 8/10 | (2006.01) |

(52) U.S. Cl.
CPC .............. *G08B 13/2451* (2013.01); *G01V 8/10* (2013.01); *G01V 8/20* (2013.01); *G08B 13/183* (2013.01); *G08B 13/248* (2013.01); *G08B 13/2491* (2013.01)

(58) Field of Classification Search
CPC ...... G08B 13/248; G08B 13/183; G01V 8/10; G01V 8/20
See application file for complete search history.

(56) References Cited

U.S. PATENT DOCUMENTS

| | | | |
|---|---|---|---|
| 4,510,489 A | 4/1985 | Anderson, III et al. | |
| 4,510,490 A | 4/1985 | Anderson, III et al. | |
| 5,353,011 A | 10/1994 | Wheeler | |
| 5,801,376 A | 9/1998 | Haberl et al. | |
| 2006/0072012 A1* | 4/2006 | Shimizu | G08B 13/183 348/152 |
| 2010/0074622 A1 | 3/2010 | Damink et al. | |
| 2011/0109455 A1 | 5/2011 | Bergman et al. | |
| 2011/0304458 A1* | 12/2011 | Sayegh | G08B 13/248 340/568.8 |
| 2014/0111338 A1 | 4/2014 | Bergman et al. | |

* cited by examiner

*Primary Examiner* — Andrew Bee
(74) *Attorney, Agent, or Firm* — Fox Rothschild LLP; Robert J. Sacco; Carol E. Thorstad-Forsyth

(57) ABSTRACT

Systems (100) and methods (1800) for determining where an object or person is located in an EAS detection zone. The methods involve: simultaneously emitting a first signal from a first emitter and a second signal from a second emitter; concurrently detecting the first and second signals during a first period of time by each of a first detector and a second detector; and determining where the object or person is within the EAS detection zone based on a pattern of a signal output from at least one of the first and second detectors which reflects that at least one of the first and second signals is blocked by the object or person during at least one of a second period of time and a third period of time in which the object or person is traveling through the EAS detection zone.

20 Claims, 11 Drawing Sheets

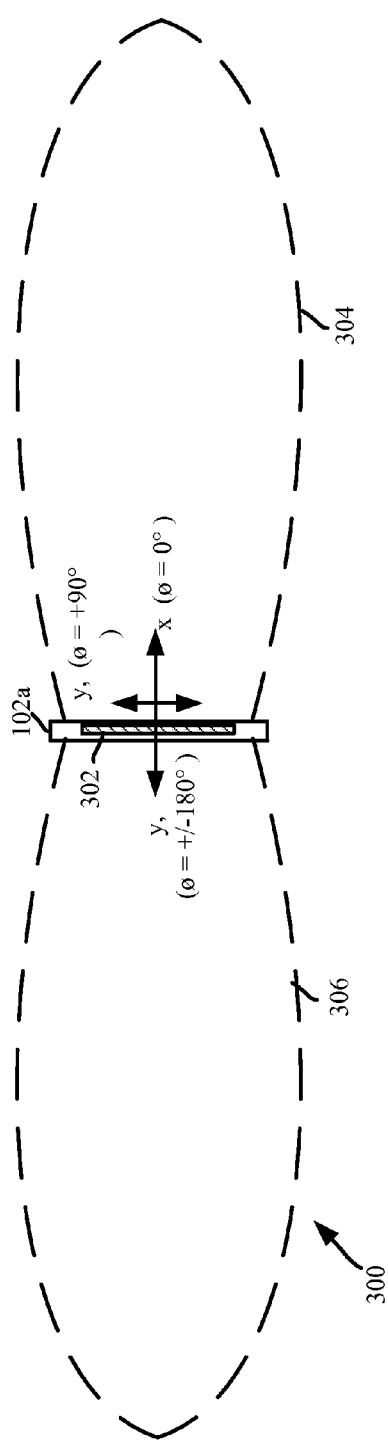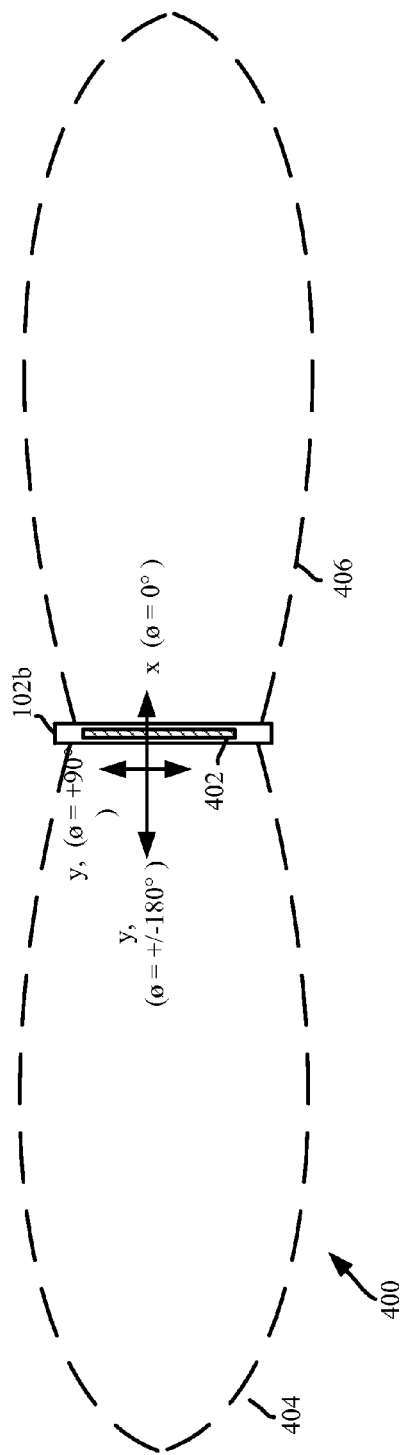

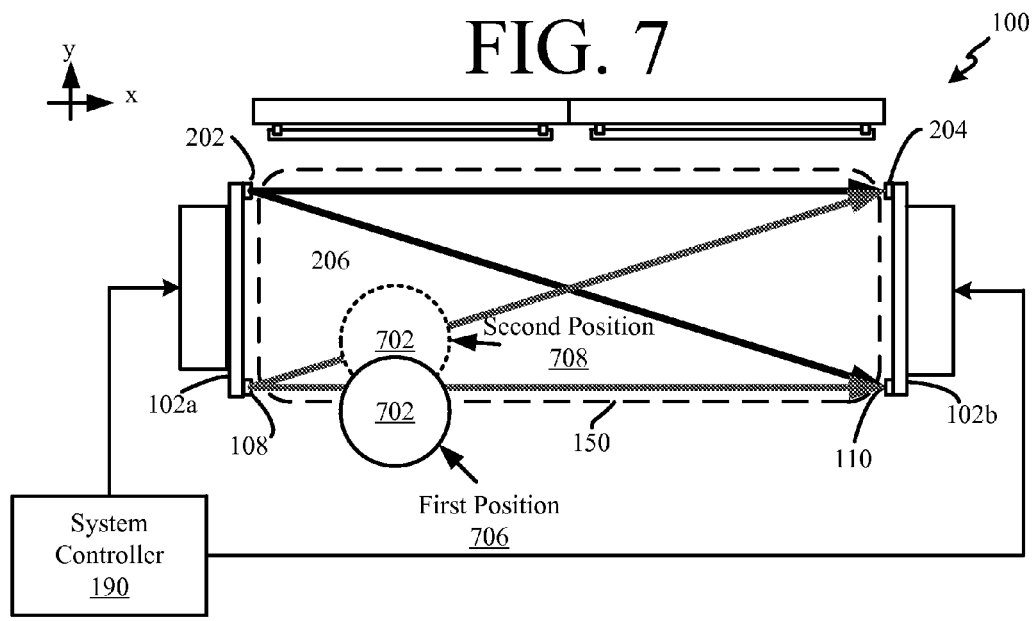
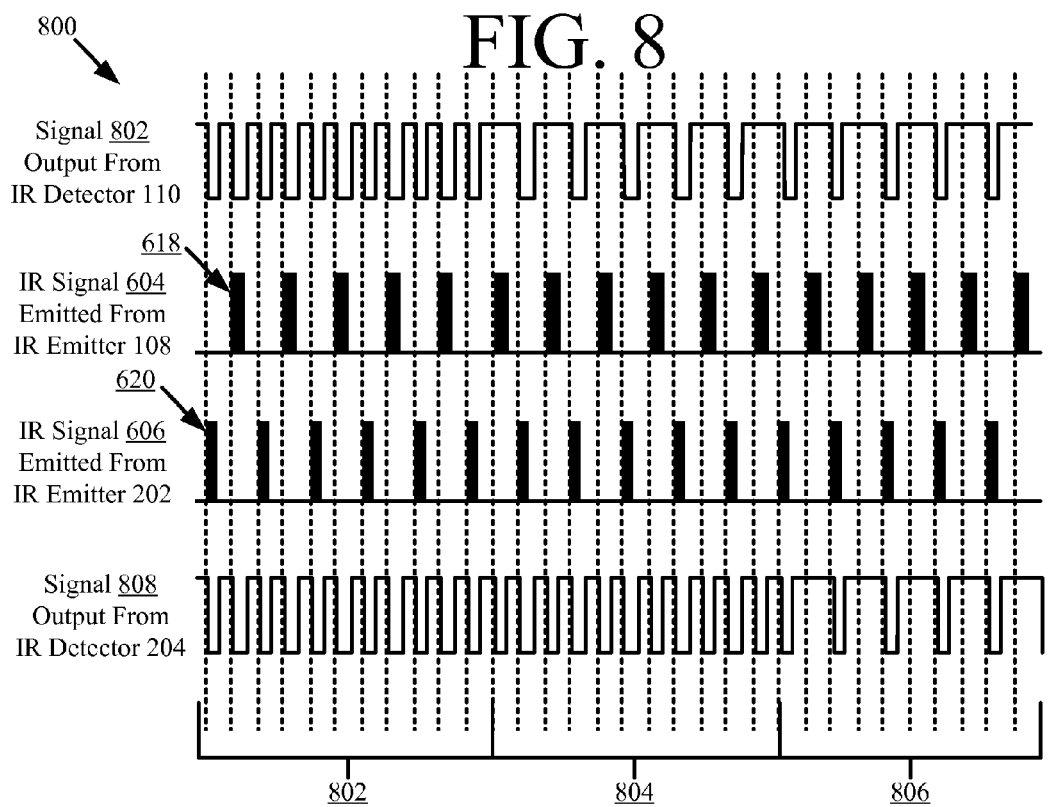

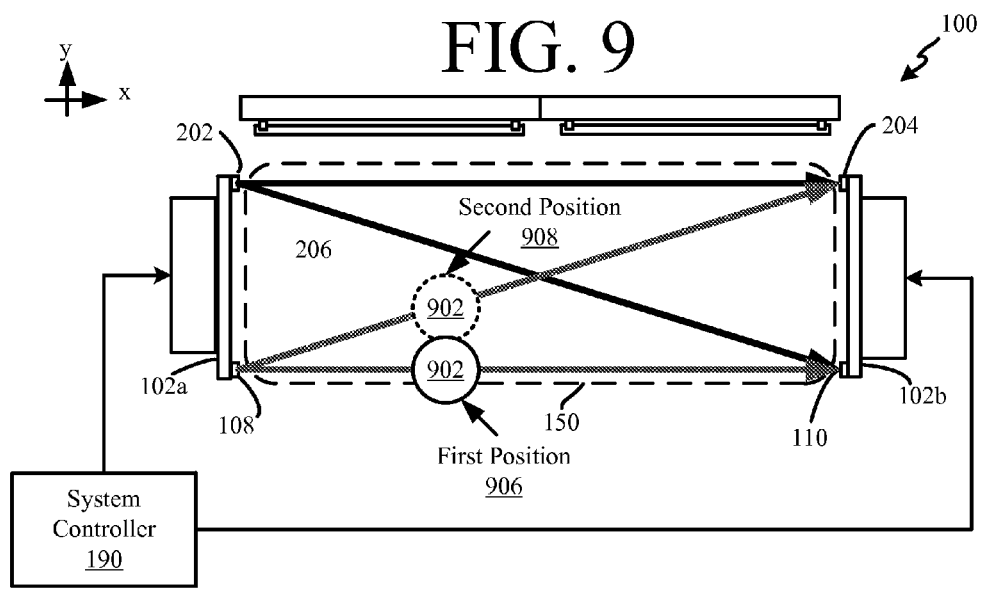
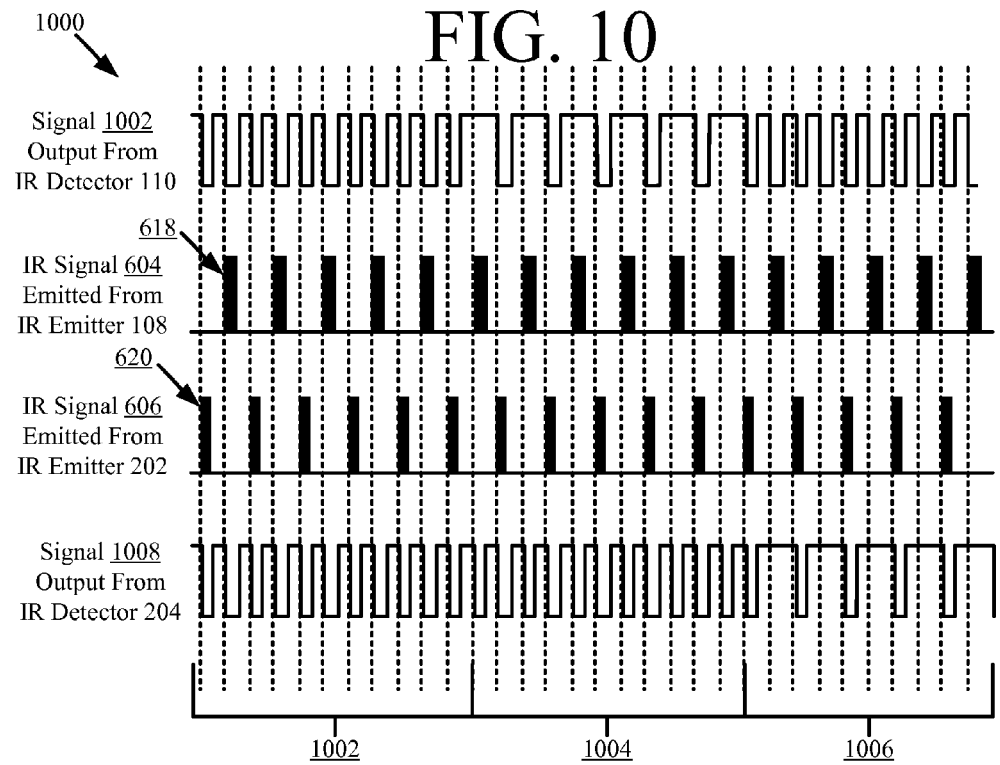

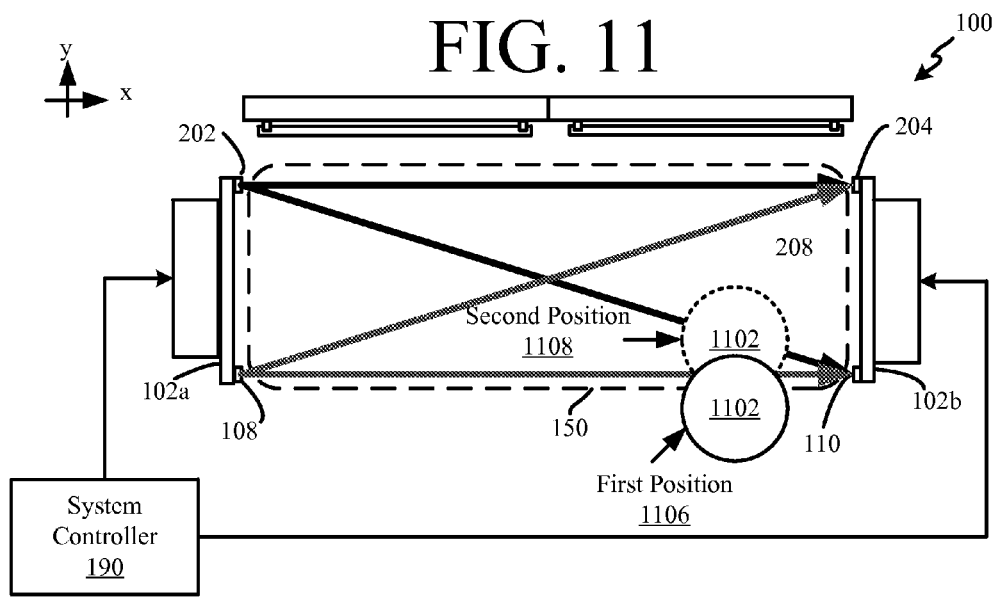
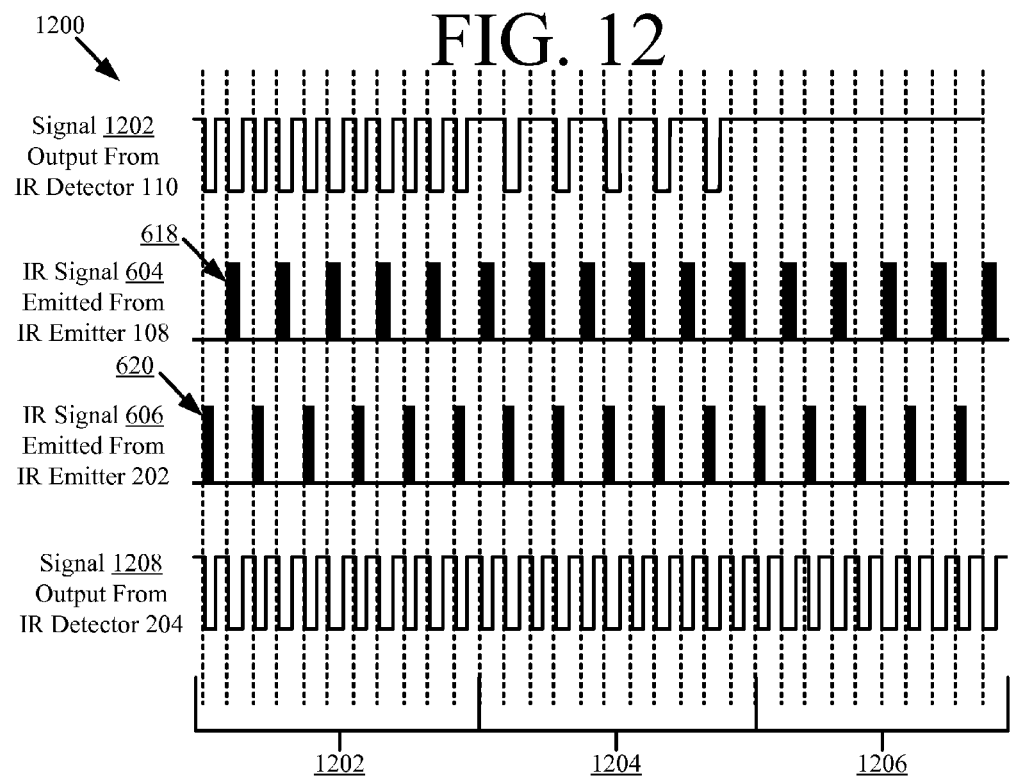

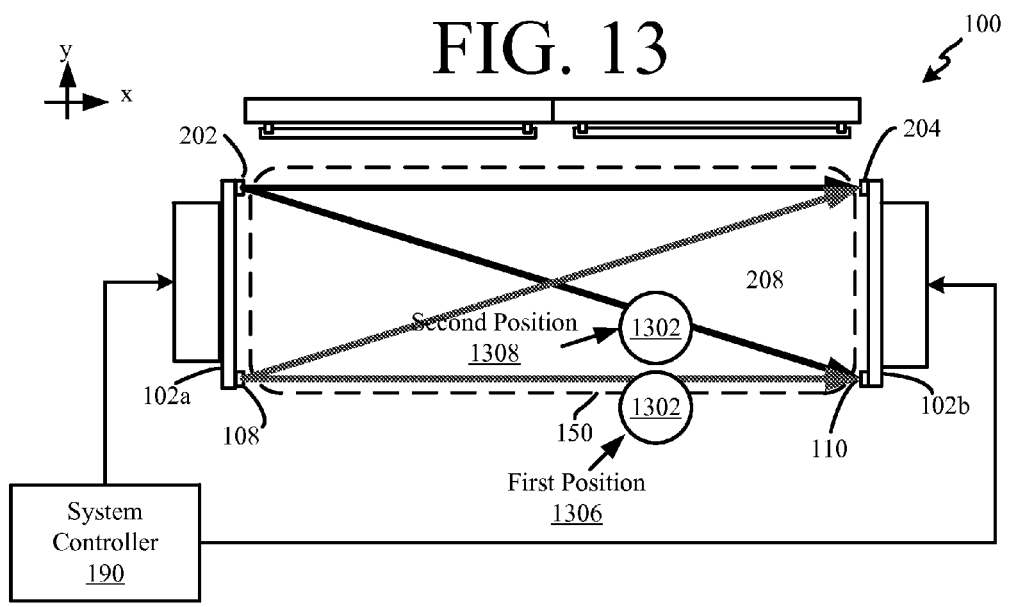
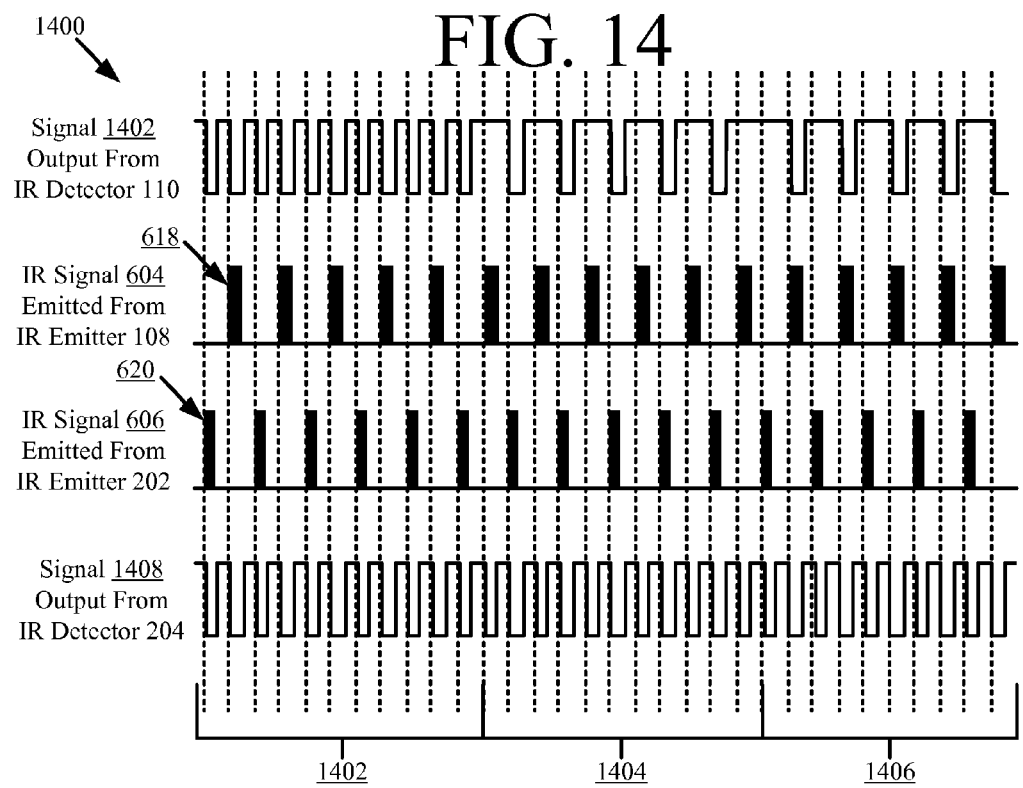

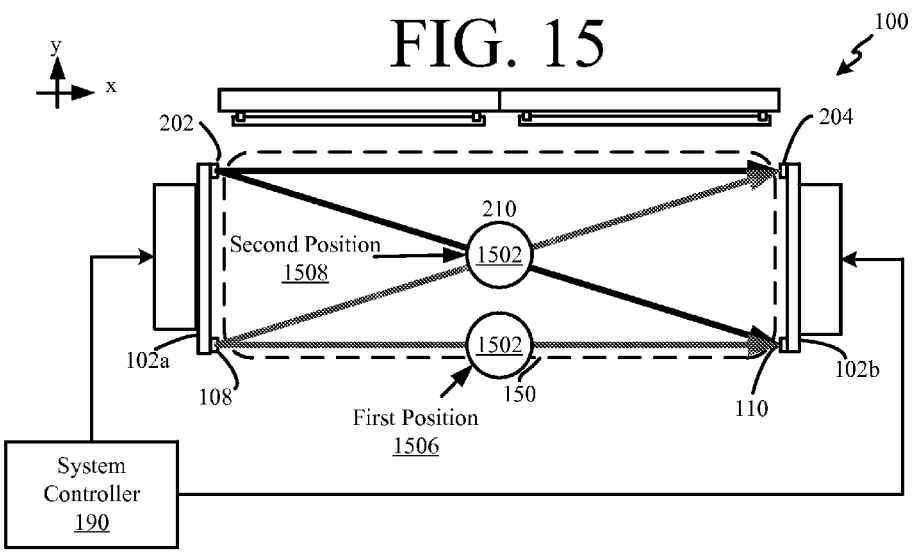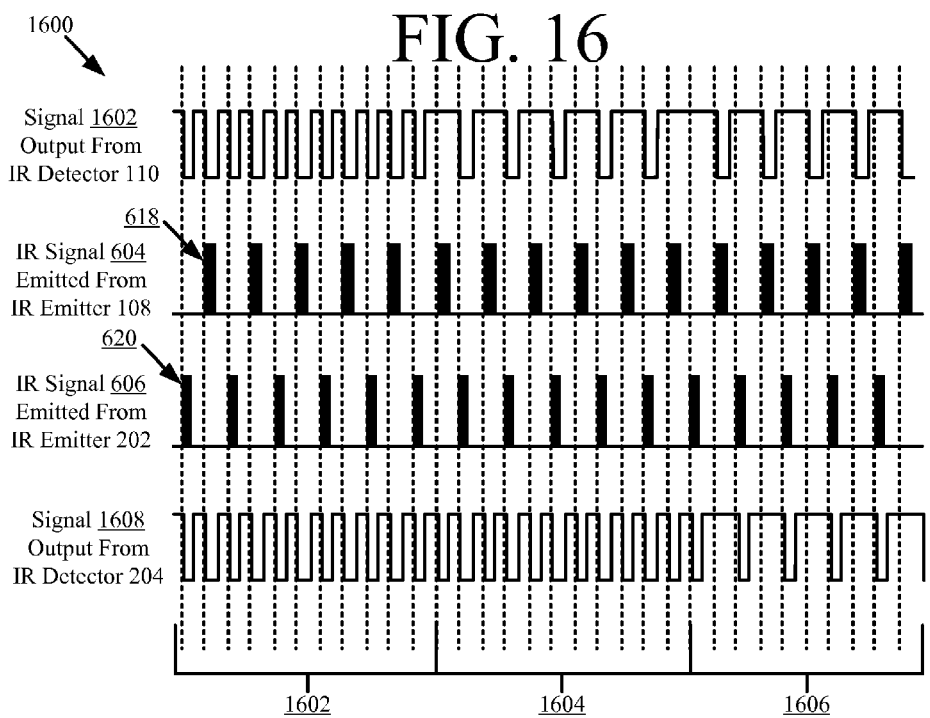

SYSTEMS AND METHODS FOR INTRA-ZONE DETECTION

BACKGROUND OF THE INVENTION

1. Statement of the Technical Field

The present invention relates generally to Electronic Article Surveillance ("EAS") detection systems. More particularly, the present invention relates to implementing systems and methods for intra-zone detection.

2. Description of the Related Art

EAS detection systems generally comprise an interrogation antenna for transmitting an electromagnetic signal into an interrogation zone, markers which respond in some known electromagnetic manner to the interrogation signal, an antenna for detecting the response of the marker, a signal analyzer for evaluating the signals produced by the detection antenna, and an alarm which indicates the presence of a marker in the interrogation zone. The alarm can then be the basis for initiating one or more appropriate responses depending upon the nature of the facility. Typically, the interrogation zone is in the vicinity of an exit from a facility such as a retail store, and the markers can be attached to articles such as items of merchandise or inventory.

One type of EAS detection system utilizes AcoustoMagnetic ("AM") markers. The general operation of an AM EAS detection system is described in U.S. Pat. Nos. 4,510,489 and 4,510,490, the disclosure of which is herein incorporated by reference. The detection of markers in an AM EAS detection system by pedestals placed at an exit has always been specifically focused on detecting markers only within the spacing of the pedestals. However, the interrogation field generated by the pedestals may extend beyond the intended detection zone. For example, a first pedestal will generally include a main antenna field directed toward a detection zone located between the first pedestal and a second pedestal. When an exciter signal is applied at the first pedestal it will generate an electro-magnetic field of sufficient intensity so as to excite markers within the detection zone. Similarly, the second pedestal will generally include an antenna having a main antenna field directed toward the detection zone (and toward the first pedestal). An exciter signal applied at the second pedestal will also generate an electromagnetic field with sufficient intensity so as to excite markers within the detection zone. When a marker tag is excited in the detection zone, it will generate an electromagnetic signal which can usually be detected by receiving the signal at the antennas associated with the first and second pedestal.

The AM EAS detection system also comprises people counters to identify which zone a person is walking through, where a zone is defined as the space between two pedestals. This information is then used to alarm only those zones that have both an AM marker and a person present therein. The AM EAS system can use AM marker amplitude to estimate which pedestal the AM marker is closest to, but multiple pedestals or multiple marker sources reduce efficiency and cannot determine which side of the pedestal a marker signal is coming from. The addition of people counters defines the specific zone further by excluding other zones a pedestal covers if there are no people present.

SUMMARY OF THE INVENTION

The present invention concerns implementing systems and methods for determining where an object or person is located in an EAS detection zone. The method involves simultaneously emitting a first signal from a first emitter (e.g., a first infrared emitter) and a second signal from a second emitter (e.g., a second infrared emitter). The first and second emitters are disposed on a first pedestal of an EAS detection system so as to point towards the EAS detection zone. In some scenarios, the first signal comprises a plurality of first signal bursts having pulse widths which are different than the pulse widths of a plurality of second signal bursts of the second signal. Additionally or alternatively, each of the plurality of first signal bursts is emitted from the first emitter at a different time than when a second signal burst is emitted from the second emitter.

The first and second signals are concurrently detected during a first period of by a first detector (e.g., a first infrared detector) and a second detector (e.g., a second infrared detector). The first and second detectors are disposed on a second pedestal of the EAS detection system so as to point towards the EAS detection zone and so as to respectively reside across from the first and second emitters. At some later time, a determination is made by a system controller or other electronic circuit (e.g., an electronic circuit disposed in a pedestal) as to where the object or person is within the EAS detection zone based on a pattern of a signal output from at least one of the first and second detectors which reflects that at least one of the first and second signals is blocked by the object or person during at least one of a second period of time and a third period of time in which the object or person is traveling through the EAS detection zone.

In some scenarios, the object or person is determined to be within an area of a plurality of EAS detection zone areas closest to the first and second emitters when: (1) the signal output from the first detector indicates that the first signal is blocked by the object or person during the second and third periods of time; and (2) the signal output from the second detector indicates that the first infrared signal is blocked by the object or person during the third period of time and not the second period of time. Alternatively or additionally, the object or person is determined to be within an area of a plurality of EAS detection zone areas closest to the first and second emitters when: (1) the signal output from the first detector indicates that the first signal is blocked by the object or person during the second period of time and not the third period of time; and (2) the signal output from the second detector indicates that the first signal is blocked by the object or person during the third period of time and not the second period of time.

In those or other scenarios, the object or person is determined to be within an area of a plurality of EAS detection zone areas closest to the first and second detectors when: (1) the signal output from the first detector indicates that the first signal is blocked by the object or person during the second and third period of time, and the second signal is blocked by the object or person during the third period of time and not the second period of time; and (2) the signal output from the second detector indicates that the neither of the first and second signals are blocked by the object or person during the second and third periods of times. Alternatively or additionally, the object or person is determined to be within an area of a plurality of EAS detection zone areas closest to the first and second detectors when: (1) the signal output from the first detector indicates that the first signal is blocked by the object or person during the second period of time and the third signal is blocked by the object or person during the third period of time; and (2) the signal output from the second detector indicates that the neither of the first and second signals are blocked by the object or person during the second and third periods of times.

In those or yet other scenarios, the object or person is determined to be within a center area of the EAS detection zone when: (1) the signal output from the first detector indicates that the second signal is blocked by the object or person; and (2) the signal output from the second detector concurrently indicates that first signal is blocked by the object or person. The location of the object or person within the EAS detection zone may also be determined based on timing differences between signal changes in the signal output from at least one of the first and second detectors.

BRIEF DESCRIPTION OF THE DRAWINGS

Embodiments will be described with reference to the following drawing figures, in which like numerals represent like items throughout the figures, and in which:

FIGS. 3 and 4 are drawings which are useful for understanding a main field and a back-field of antennas which are used in the EAS detection system of FIG. 1.

FIG. 7 is a schematic illustration that is useful for understanding operations of the system shown in FIG. 1 when an object or person travels through an EAS detection zone on an emitter side thereof.

FIG. 8 is a graph showing signals output from two IR detectors during a scenario presented in FIG. 7.

FIG. 9 is schematic illustration that is useful for understanding operations of the system shown in FIG. 1 when an object or person travels through an EAS detections zone on an emitter side thereof.

FIG. 10 is a graph showing signals output from two IR detectors during a scenario presented in FIG. 9.

FIG. 11 is a schematic illustration that is useful for understanding operations of the system shown in FIG. 1 when an object or person travels through a detector side of an EAS detections zone.

FIG. 12 is a graph showing signals output from two IR detectors during a scenario presented in FIG. 11.

FIG. 13 is a schematic illustration that is useful for understanding operations of the system shown in FIG. 1 when an object or person travels through a detector side of an EAS detection zone.

FIG. 14 is a graph showing signals output from two IR detectors during a scenario presented in FIG. 13.

FIG. 15 is a schematic illustration that is useful for understanding operations of the system shown in FIG. 1 when an object or person travels through a center of an EAS detection zone.

FIG. 16 is a graph showing signals output from two IR detectors during a scenario presented in FIG. 15.

DETAILED DESCRIPTION OF THE INVENTION

Figure 1:
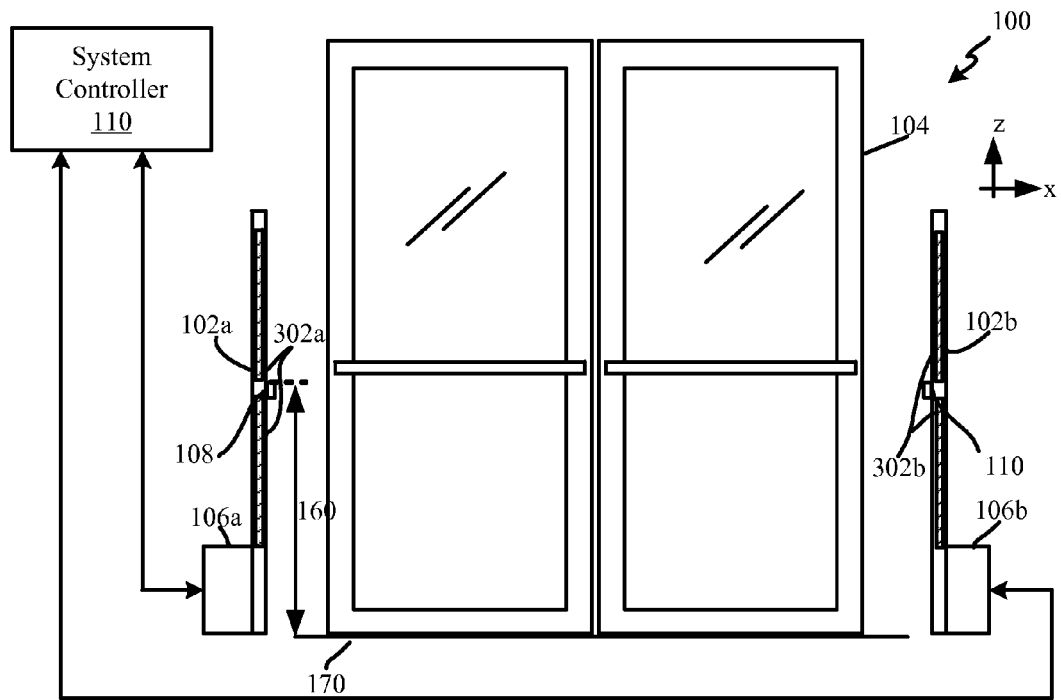
FIG. 1 is a side view of an EAS detection system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, conventional EAS systems employ people counters to identify which zone a person is walking through. However, the identification of the zone is limited to the space between two pedestals off a conventional EAS system, with no information about where within the zone a person is walking or to which pedestal they are closer. The present invention provides a solution to these drawbacks of the conventional EAS systems. Additionally, in the present invention, knowledge about where a person is in relation to the pedestals of an EAS system is used to identify a specific pedestal to alarm, dynamically change antenna settings, or eliminate alarms in areas where marker detection is not wanted (e.g., in a back-field of a pedestal). This will become more evident as the discussion progresses.

Figure 2:
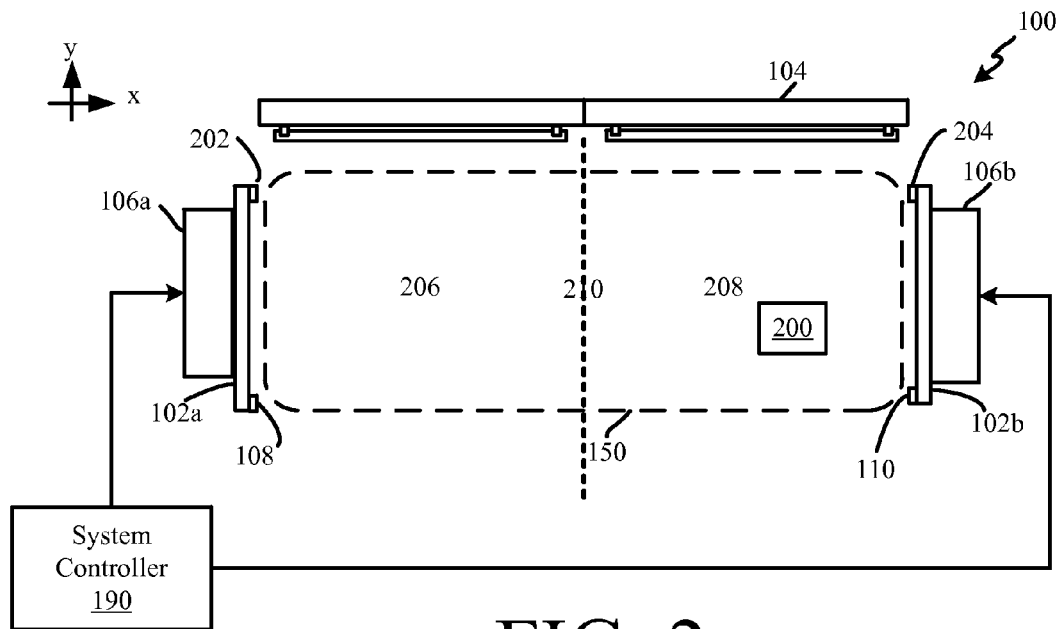
FIG. 2 is a top view of the EAS detection system in FIG. 1, which is useful for understanding an EAS detection zone thereof.

Referring now to FIGS. 1 and 2, an exemplary architecture for an EAS detection system 100 is provided. Notably, the present invention is described herein in terms of an AM EAS detection system. However, the method of the invention can also be used in other types of EAS detection systems, including systems that use Radio Frequency ("RF") type tags and Radio Frequency IDentification ("RFID") EAS detection systems.

The EAS detection system 100 will be positioned at a location adjacent to an entry/exit 104 of a secured facility (e.g., a retail store). The EAS detection system 100 uses specially designed EAS marker tags ("security tags") which are applied to store merchandise or other items which are stored within a secured facility. The security tags can be deactivated or removed by authorized personnel at the secure facility. For example, in a retail environment, the security tags could be removed by store employees. When an active security tag 200 is detected by the EAS detection system 100 in an idealized representation of an EAS detection zone 150 near the entry/exit, the EAS detection system will detect the presence of such security tag and will sound an alarm or generate some other suitable EAS response. Accordingly, the EAS detection system 100 is arranged for detecting and preventing the unauthorized removal of articles or products from controlled areas.

The EAS detection system 100 includes a pair of pedestals 102a, 102b, which are located a known distance apart (e.g., at opposing sides of an entry/exit 104). The pedestals 102a, 102b are typically stabilized and supported by a base 106a, 106b. The pedestals 102a, 102b will each generally include one or more antennas that are suitable for aiding in the detection of the special EAS security tags, as described herein. For example, pedestal 102a can include at least one antenna 302 suitable for transmitting or producing an electromagnetic exciter signal field and receiving response signals generated by security tags in the EAS detection zone 150. In some embodiments, the same antenna can be used for both receive and transmit functions. Similarly, pedestal 102b can include at least one antenna 402 suitable for transmitting or producing an electromagnetic exciter signal field and receiving response signals generated by security tags in the EAS detection zone 150. The antennas provided in pedestals 102a, 102b can be conventional conductive wire coil or loop designs as are commonly used in AM type EAS pedestals. These antennas will sometimes be referred to herein as exciter coils. In some embodiments, a single antenna can be used in each pedestal. The single antenna is selectively coupled to the EAS receiver. The EAS transmitter is operated in a time multiplexed manner. However, it can be advantageous to include two antennas (or exciter coils) in each pedestal as shown in FIG. 1, with an upper antenna positioned above a lower antenna.

The antennas located in the pedestals 102a, 102b are electrically coupled to a system controller 190. The system controller 190 controls the operation of the EAS detection system 100 to perform EAS functions as described herein. The system controller 190 can be located within a base 106a, 106b of one of the pedestals 102a, 102b or can be located within a separate chassis at a location nearby to the pedestals. For example, the system controller 190 can be located in a ceiling just above or adjacent to the pedestals 102a, 102b.

As noted above, the EAS detection system comprises an AM type EAS detection system. As such, each antenna is used to generate an Electro-Magnetic ("EM") field which serves as a security tag exciter signal. The security tag exciter signal causes a mechanical oscillation of a strip (e.g., a strip formed of a magnetostrictive or ferromagnetic amorphous metal) contained in a security tag within an EAS detection zone 150.

As a result of the stimulus signal, the security tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the EAS detection zone 150. As noted above, the same antenna contained in a pedestal 102a, 102b can serve as both the transmit antenna and the receive antenna. Accordingly, the antennas in each of the pedestals 102a, 102b can be used in several different modes to detect a security tag exciter signal. These modes will be described below in further detail.

Referring now to FIGS. 3 and 4, there are shown exemplary antenna field patterns 300, 400 for antennas 302, 402 contained in pedestals 102a, 102b. As is known in the art, an antenna radiation pattern is a graphical representation of the radiating (or receiving) properties for a given antenna as a function of space. The properties of an antenna are the same in a transmit mode and a receive mode of operation. As such, the antenna radiation pattern shown is applicable for both transmit and receive operations as described herein. The exemplary antenna field patterns 300, 400 shown in FIGS. 3-4 are azimuth plane patterns representing the antenna pattern in the x, y coordinate plane. The azimuth pattern is represented in polar coordinate form and is sufficient for understanding the inventive arrangements. The azimuth antenna field patterns shown in FIGS. 3-4 are a useful way of visualizing the direction in which the antennas 302, 402 will transmit and receive signals at a particular transmitter power level.

Figure 5:
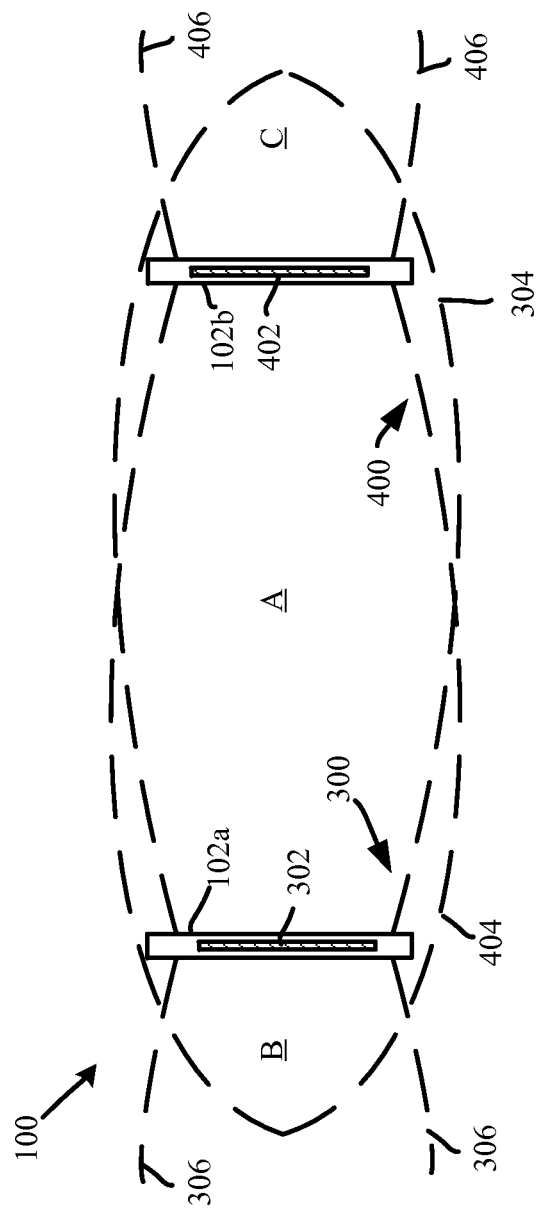
FIG. 5 is a drawing which is useful for understanding a detection zone in the EAS detection system of FIG. 1.

The antenna field pattern 300 shown in FIG. 3 includes a main lobe 304 with a peak at ø=0° and a back-field lobe 306 with a peak at angle ø=180°. Conversely, the antenna field pattern 400 shown in FIG. 4 includes a main lobe 404 with its peak at ø=180° and a back-field lobe 406 with a peak at angle ø=0°. In the EAS detection system 100, each pedestal 102a, 102b is positioned so that the main lobe of an antenna contained therein is directed into the EAS detection zone 150. Accordingly, a pair of pedestals 102a, 102b in the EAS detection system 100 will produce overlap in the antenna field patterns 300, 400, as shown in FIG. 5. Notably, the antenna field patterns 300, 400 shown in FIG. 5 are scaled for purposes of understanding the present invention. In particular, the patterns show the outer boundary or limits of an area in which an exciter signal of particular amplitude applied to antennas 302, 402 will produce a detectable response in an EAS security tag. However, it should be understood that a security tag within the bounds of at least one antenna field pattern 300, 400 will generate a detectable response when stimulated by an exciter signal.

The overlapping antenna field patterns 300, 400 in FIG. 5 will include an area A where there is overlap of main lobes 304, 404. However, it can be observed in FIG. 5 that there can also be some overlap of a main lobe of each pedestal with a back-field lobe associated with the other pedestal. For example, it can be observed that the main lobe 404 overlaps with the back-field lobe 306 within an area B. Similarly, the main lobe 304 overlaps with the back-field lobe 306 in an area C. Area A between pedestals 102a, 102b defines the EAS detection zone 150 in which active security tags should cause the EAS detection system 100 to generate an alarm response. Security tags in area A are stimulated by energy associated with an exciter signal within the main lobes 304, 404 and will produce a response which can be detected at each antenna. The response produced by a security tag in area A is detected within the main lobes of each antenna and processed in the system controller 190. Notably, a security tag in areas B or C will also be excited by the antennas 302, 402. The response signal produced by a security tag in these areas B and C will also be received at one or both antennas. This response signal is referred to herein as a "security tag signal".

Referring again to FIGS. 1-2, at least two IR emitters 108, 202 are disposed on pedestal 102a. At least two IR detectors 110, 204 are disposed on pedestal 102b so as to be respectively located directly across from the emitters 108, 202. IR emitters and detectors are well known in the art, and therefore will not be described herein. Any known or to be known IR emitters and/or IR detectors can be used herein without limitation. Also, the present invention is not limited to IR emitters and detectors. Other emitter/detector configurations can be employed herein.

The IR emitters and detectors are arranged so as to point towards the EAS detection zone 150. As such, the IR emitters and detectors facilitate the detection of object and persons moving through the EAS detection zone 150. In this regard, both IR detectors 110, 204 detect IR light beams emitted from both IR emitters 108, 202. Other IR emitters and detectors may additionally be used to increase the detection of object and persons outside of the EAS detection zone 150. In this case, the additional IR emitters and detectors may be disposed outside of the EAS detection zone 150.

Although only two IR emitters and IR detectors are shown in FIGS. 1-2, the present invention is not limited in this regard. Any number of IR emitters and IR detectors can be employed in the present invention that is suitable for particular applications. For example, a plurality of IR emitters can be disposed along an entire width of the pedestal 102a. Similarly, a plurality of IR detectors can be disposed along an entire width of the pedestal 102b. In all cases, each adjacent pair of IR emitters is spaced apart by the same or different distance as another adjacent pair of IR emitters. Likewise, each adjacent pair of IR detectors is spaced apart by the same or different distance as another adjacent pair of IR detectors.

Additionally, each IR emitter and IR detector is shown as being located a certain distance 160 from the floor 170. Distance 160 can have any value selected in accordance a particular application. For example, distance 160 is selected as fifty-three inches, which is considered an optimal height for beam break detection caused by humans. This height ensures that children will not cause beam breaks, and also that errors do not occur in connection with moving limbs. The present invention is not limited to the particulars of this example.

The IR emitters and detectors provide a means to detect beam breaks by objects or persons moving through the EAS detection zone 150 established between the pedestals 102a, 102b. As an object or person moves through the EAS detection zone 150, the object or person blocks the IR light beams emitted from the IR detectors 108, 202 in a particular order. Depending on which side of the EAS detection zone 150 a beam break occurs, the output beam break information generated by the IR detectors 110, 204 will be different. For example, a person walking in direction y on the emitter side 206 of the EAS detection zone 150 is going to cause a beam break in the IR light beam emitted from IR emitter 108 to be detected by IR detector 110 and then a beam break in the IR light beam emitted from that same IR emitter 108 to be detected by the other IR detector 204. In contrast, a person walking on the detector side 208 of the EAS detection zone 150 will cause a beam break in the IR light beam emitted from IR emitter 108 to be detected by IR detector 110 and then cause a beam break in the IR light beam emitted from IR emitter 202 to be detected by the same IR detector 110. A person walking in direction y through the center 210 of the EAS detection zone 150 will cause a beam break in the IR light beams emitted from both IR emitters 108, 202. More specifically, the beam break in the IR light beam emitted from IR emitter 202 will be detected by IR detector 110, while the beam break in the IR light beam emitted from IR emitter 108 is being detected by IR detector 204.

An algorithm implemented in the system controller 190 (or other electronic circuit of a pedestal) uses the beam break order information to (1) detect an object and person moving through the EAS detection zone 150, (2) determine the direction of movement of the object or person through the EAS detection zone 150, and (3) determine which side of the EAS detection zone 150 the object or person is traveling through. By identifying specific beam break patterns, the algorithm can determine if a person walked through the EAS detection zone 150 on the emitter side 206, the detector side 208, or in the center 210 thereof. Analysis of the timing between beam breaks is also used to estimate a distance the object or person is from a given pedestal 102a, 102b. The manner in which the detections/determinations of (1)-(3) and the distance estimation are achieved will become evident as the discussion progresses.

Figure 6:
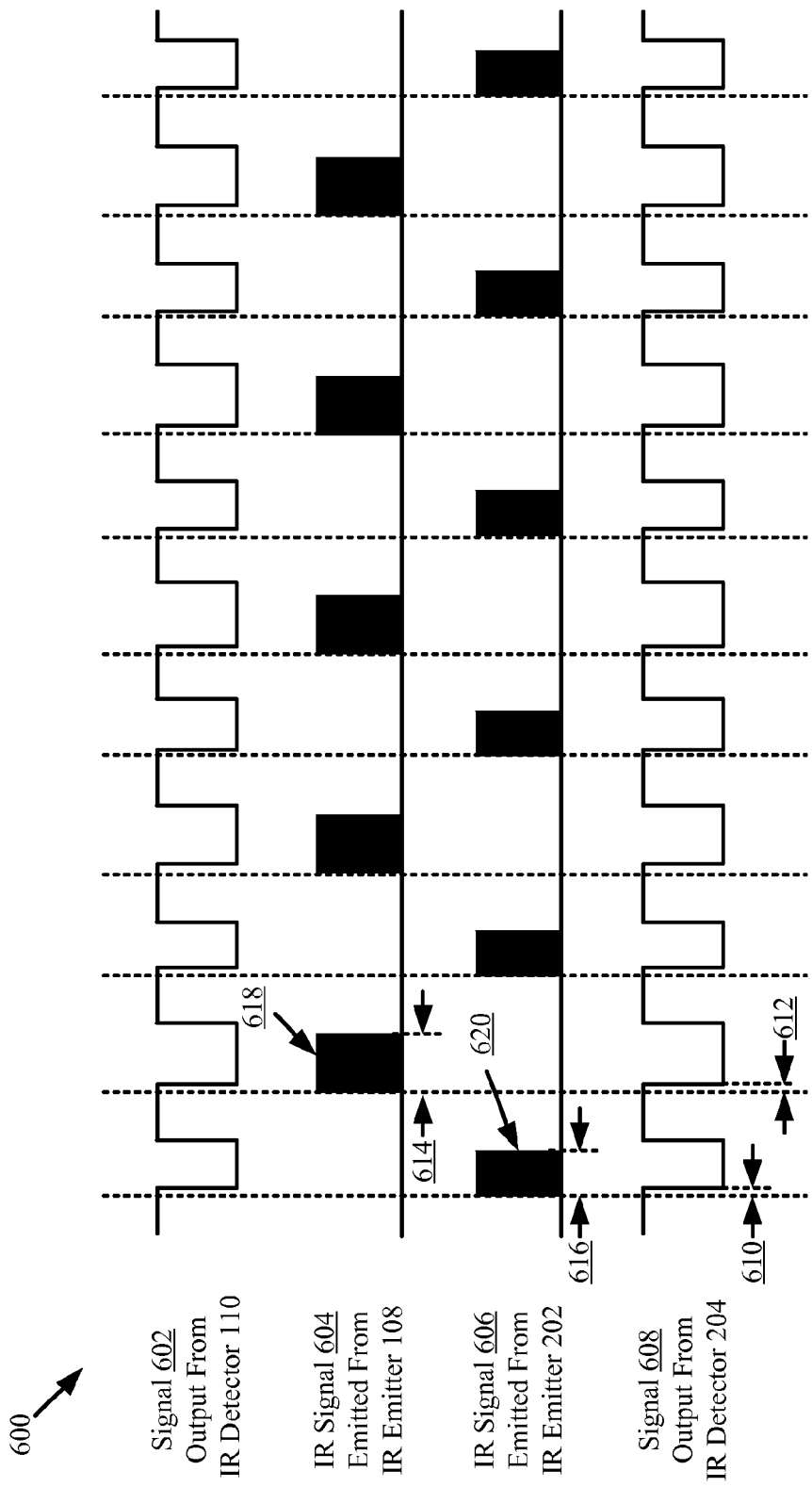
FIG. 6 is a graph showing Infrared ("IR") signals emitted from two IR emitters and signals output from two IR detectors when no beam breaks occur during a given period of time.

Referring now to FIG. 6, there is provided a graph 600 that is useful for understanding operations of the system 100 when no beam breaks occur during a given period of time. Accordingly, graph 600 schematically illustrates the IR signals 604, 606 emitted from the IR emitters 108, 202 and the signals 602, 608 output from the IR detectors 110, 204 as a result of the reception of the two emitted IR signals 604, 606 thereat. Emitted IR signal 604 is shown as comprising Time Division Multiplexed ("TDM") bursts having a frequency of N KHz (e.g., 38 KHz) and a pulse width 614 of M us (e.g., 900 us). Emitted IR signal 606 is shown as comprising TDM bursts having a frequency of N KHz (e.g., 38 KHz) and a pulse width 616 of X us (e.g., 500 us). Each TDM burst 618 of IR signal 604 is offset in time from an adjacent TDM burst 620 of IR signal 606. The present invention is not limited to TDM based burst techniques for the emitted IR signals. Other techniques can be used which employ different modulation frequencies, different wavelengths, different pulse widths and different data stream transmissions.

In FIG. 6, the two output signals 602, 608 are the same since both IR signals 604, 606 are being received at both IR detectors 110, 204. The output static state of each IR detector 110, 204 is high. Thus, a signal output from an IR detector transitions from its high static state to a low state when the IR detector receives an emitted IR signal burst. A relatively short time delay 614 occurs between the time at which a TDM burst 618 of the IR signal 604 is emitted from IR emitter 108 and the time at which the state of the signal 602 or 608 changes to its low state in response to the reception of the TDM burst 618 at the IR detector 110 or 204. Likewise, a time delay 616 occurs between the time at which a TDM burst 620 of the IR signal 606 is emitted from IR emitter 202 and the time at which the state of the signal 602 or 608 changes to its low state in response to the reception of the TDM burst 620 at the IR detector 110 or 204.

The two signals 602, 608 are provided from the IR detectors 110, 204 to the system controller 190 for processing. The system controller 190 makes a determination that there aren't any objects or persons traveling through the EAS detection zone 150 when the two signals 602, 608 indicate that both IR signals 604, 606 are being received at both IR detectors 110, 204. In some scenarios, the system controller 190 will not take any subsequent control measures in response to such a determination.

Various scenarios will now be described in relation to FIGS. 7-17. In each scenario, an object or person is traveling in a particular direction (e.g., a y direction) through the EAS detection zone 150. The present invention is not limited in this regard. As should be readily understood by a reader, the object or person could travel in an opposite direction through the EAS detection zone 150. In this case, the particular order in which the beam breaks occur in relation to IR emitters 108, 202 could change in accordance with each particular scenario. These beam break order changes will be evident to a reader as the discussion progresses.

Referring now to FIG. 7, there is provided a schematic illustration that is useful for understanding a scenario in which an object or person 702 is traveling through the EAS detection zone 150 on the emitter side 206. As shown in FIG. 7, the object or person 702 is traveling in the y direction. Before the person enters the EAS detection zone 150, the two signals output from the IR detectors 110, 204 are the same as that shown in FIG. 6.

Notably, a beam break pattern may indicate that a person or object is in the emitter side 206 of the EAS detection zone 150 when an IR signal 604 emitted from emitter 108 is blocked on IR detector 110 before being blocked on IR detector 204. This will become more evident as the discussion progresses.

As the object or person travels into the EAS detection zone, the object or person 702 first causes a beam break in IR signal 604 emitted from IR emitter 108, but not in the IR signal 606 emitted from IR emitter 202. The beam break in the IR signal 604 is detected by the IR detector 110, and not by the IR detector 204. In effect, the IR detector 110 receives TDM bursts 620 only from the IR emitter 202 during a period of time when the object or person 702 is in the first position 706, whereby the IR detector 110 detects the beam break in the IR signal 604 emitted from IR emitter 108. In contrast, the IR detector 204 receives TDM bursts 618, 620 from both the IR emitters 108, 202 during this period of time.

If the object or person 702 continues to travel into the EAS detection zone 150, then the object or person 702 will next cause a beam break in the IR signal 604 to be concurrently detected by the IR detectors 110 and 204. At this time, both IR detectors 110, 204 receive TDM bursts 620 only from the IR emitter 202 during a period of time when the object or person 702 is in the second position 708, whereby both IR detectors 110, 204 detect the beam break in the IR signal 604 emitted from IR emitter 108.

A graph 800 showing the signals 802, 808 output from the IR detectors 110, 204 during the scenario presented in FIG. 7 is provided in FIG. 8. As shown in FIG. 8, both IR signals 604, 606 are received at both IR detectors 110, 204 during a first period of time 802. The first period of time is when the object or person 702 has not yet caused a beam break to occur.

During a second period of time 804, the object or person 702 is in its first position 706. As such, a beam break occurs in relation to the IR signal 604 emitted from IR emitter 108. In effect, the IR detector 110 only receives the IR signal 606 emitted from IR emitter 202 during the second period of time 804. However, the IR detector 204 continues to receive the IR signals 604 and 606 from both IR emitters 108, 202.

During a third period of time 806, the object or person 702 is in its second position 708. As such, a beam break occurs in relation to the IR signal 604 emitted from IR emitter 108. Consequently, both IR detectors 110, 204 only receive the IR signal 606 from IR emitter 202 during the third period of time 806.

The two output signals 802, 808 are provided from the IR detectors 110, 204 to the system controller 190 for processing. The system controller 190 makes a determination that there is an object or person traveling through emitter side 206 of the EAS detection zone 150 when the combined IR signals 802, 808 have the beam break patterns shown in FIG. 8, i.e., when (1) the combined IR signal 802 indicates that only the IR signal 606 is being received by IR detector 110 during the second and third periods of time and (2) the combined IR signal 808 indicates that only the IR signal 606 is being received by the IR detector 204 during the third period of time.

In some scenarios, the system controller 190 will take subsequent control measures in response to such a determination. For example, the system controller 190 may perform actions to properly alarm the correct pedestal of the EAS detection system. When a person walks through the EAS detection zone 150 with an activated security tag, both pedestals 102a and 102b detect the presence of the activated security tag. In conventional EAS detection systems, visual and/or auditory alarms of both pedestals 102a and 102b will issue. This is not desirable in certain situations. Accordingly, in the present invention, the system controller 190 determines whether the person is traveling through the emitter side, center or detector side of the EAS detection zone based on the signals output from the IR detectors 110, 204. Based on the results of this determination, the system controller 190 will perform actions to cause only the alarm(s) of the pedestal closest to the person to issue. As a result, the EAS detection system of the present invention provides store personnel with a clear indication of (1) which area of the EAS detection zone the person is walking through, and/or (2) which EAS detection zone of a plurality of adjacent EAS detection zones the person is walking through. In effect, the store personnel can make a more informed decision as to which person of a plurality of people traveling through the EAS detection zone(s) actually has possession of the activated security tag.

Additionally or alternatively, the system controller 190 may use the results of the determination to dynamically modify (e.g., lower) the strength of a pedestal's antenna radiation field. This dynamic modification has certain advantages, such as the conservation of battery power. For example, if the determination indicates that the person is traveling through the emitter side of the EAS detection zone, then the strength of the antenna radiation field emitted from pedestal 102a is dynamically lowered. Similarly, if the determination indicates that the person is traveling through the detector side of the EAS detection zone, then the strength of the antenna radiation field emitted from pedestal 102b is dynamically lowered. If the determination indicates that the person is traveling through the center of the EAS detection zone, then the strength of the antenna radiation field emitted from pedestals 102a and 102b are both changed.

The system controller 190 may also use the result of the determination to prevent alarm issuance if certain conditions are met. For example, let's consider a first scenario in which both pedestals 102a and 102b detect a security tag in proximity thereto, but the output signals of the IR detectors indicate that the person is not within the EAS detection zone. In this case, issuance of the pedestals alarms is prevented since the person is likely in the backfield of a pedestal. Let's now consider a second scenario in which both pedestals 102a and 102b detect a security tag in proximity thereto, but the output signals of the IR detectors indicate that the person is entering the facility. In this case, issuance of the pedestals alarms is also prevented since it is only desirable to issue alarms in connection with people exiting the facility. The present invention is not limited to the particulars of these two examples. For example, emitters and detectors could be placed outside of the EAS detection zone and operative to work with the emitters/ detectors disposed on pedestals 102a, 102b to eliminate alarm issuances from security tags located behind a pedestal (e.g., in areas B and C of FIG. 5).

Referring now to FIG. 9, there is provided a schematic illustration that is useful for understanding another scenario in which an object or person 902 is traveling through the EAS detection zone 150 on the emitter side 206. As shown in FIG. 9, the object or person 902 is traveling in the y direction. Before the person enters the EAS detection zone 150, the two signals output from the IR detectors 110, 204 are the same as that shown in FIG. 6.

Notably, a beam break pattern may indicate that a person or object is in the emitter side 206 of the EAS detection zone 150 when an IR signal 604 emitted from emitter 108 is blocked on IR detector 110 before being blocked on IR detector 204. This will become more evident as the discussion progresses.

As the object or person travels into the EAS detection zone, the object or person 902 first causes a beam break in an IR signal 604 emitted from IR emitter 108, but not in IR signal 606 emitted from IR emitter 202. The beam break is detected by the IR detector 110 and not by the IR detector 204. In effect, the IR detector 110 receives TDM bursts 620 only from the IR emitter 202 during a period of time when the object or person 902 is in the first position 906, whereby the IR detector 110 detects the beam break in the IR signal 604 emitted from IR emitter 108. In contrast, the IR detector 204 receives TDM bursts 618, 620 from both the IR emitters 108, 202 during this period of time.

If the object or person 902 continues to travel into the EAS detection zone 150, then the object or person 902 will continue to cause a beam break in the IR signal 604. However, this beam break will not be detected by IR detector 110, but rather only IR detector 204. At this time, IR detector 110 receives TDM bursts 618, 620 from both the IR emitters 108 and 202, while IR detector 204 only receives TDM bursts 620 from IR emitter 202.

A graph 1000 showing the signals 1002, 1008 output from the IR detectors 110, 204 during the scenario presented in FIG. 9 is provided in FIG. 10. As shown in FIG. 10, both IR signals 604, 606 are received at both IR detectors 110, 204 during a first period of time 1002. The first period of time is when the object or person 902 has not yet caused a beam break to occur.

During a second period of time 1004, the object or person 902 is in its first position 906. As such, a beam break occurs in relation to the IR signal 604 emitted from IR emitter 108. In effect, the IR detector 110 only receives the IR signal 606 from IR emitter 202 during the second period of time 1004. However, the IR detector 204 continues to receive the IR signals 604 and 606 from both IR emitters 108, 202.

Notably, in some scenarios, the IR detector 110 may receive TDM bursts from both IR emitters 108 and 202 prior to the detection of the IR signal's 604 beam break by IR detector 204. In this case, signal 1002 would show that both IR signals 604 and 606 are being received by IR detector 110 at the end of the second period 1004.

During a third period of time 1006, the object or person 902 is in its second position 908. As such, a beam break occurs in relation to the IR signal 604 emitted from IR emitter 108. However, this beam break will not be detected by IR detector 110, but rather only IR detector 204. Consequently, the signal 1002 output from IR detector 110 has the same shape and characteristics as it did during the first time period 1002. In contrast, the signal 1008 output from the IR detector 204 has a shape indicating that the IR detector 204 is only receiving TDM bursts 620 during the third time period 1006.

The two signals 1002, 1008 are provided from the IR detectors 110, 204 to the system controller 190 for processing. The system controller 190 makes a determination that there is an object or person traveling through emitter side 206 of the EAS detection zone 150 when the signals 1002, 1008 have the beam break patterns shown in FIG. 10, i.e., when (1) the signals 1002, 1008 indicate that both IR signals 604, 606 are received by the IR detectors 110, 204 during the first period of time 1002, (2) the signal 1002 indicates that the IR signal 604 is not being received by IR detector 110 during the second period of time 1004, and (3) the signal 1008 indicates that the IR signal 604 is not being received by the IR detector 204 during the third period of time 1006. In some scenarios, the system controller 190 will take subsequent control measures in response to such a determination. The subsequent control measures are the same as or similar to those described above in relation to FIG. 8.

Referring now to FIG. 11, there is provided a schematic illustration that is useful for understanding a scenario in which an object or person 1102 is traveling through the EAS detection zone 150 on the detector side 208. As shown in FIG. 11, the object or person 1102 is traveling in the y direction. Before the person enters the EAS detection zone 150, the two signals output from the IR detectors 110, 204 are the same as that shown in FIG. 6.

Notably, a beam break pattern may indicate that a person or object is located in the detector side when an IR signal emitted from the IR emitter 108 is blocked on IR detector 110 before the IR signal emitted from non-adjacent emitter 202 is blocked on IR detector 110. This will become more evident as the discussion progresses.

As the object or person travels into the EAS detection zone 150, the object or person 1102 first causes a beam break in an IR signal 604 emitted from IR emitter 108, but not in the IR signal 606 emitted from IR emitter 202. The beam break is detected by the IR detector 110 and not by the IR detector 204. In effect, the IR detector 110 receives TDM bursts 620 only from the IR emitter 202 during a period of time when the object or person 1102 is in the first position 1106, whereby the IR detector 110 detects the beam break in the IR signal 604 emitted from IR emitter 108. In contrast, the IR detector 204 receives TDM bursts 618, 620 from both the IR emitters 108, 202 during this period of time.

If the object or person 1102 continues to travel into the EAS detection zone 150, then the object or person 1102 will next cause a beam break in the IR signal 606 to also be detected by the IR detector 110. At this time, the IR detector 110 does not receive any TDM bursts 618, 620 from the two IR emitters 108, 202 during a period of time when the object or person 1102 is in the second position 1108, whereby the IR detector 110 detects the concurrent beam breaks in the IR signals 604, 606 emitted from IR emitters 108, 202. Notably, during this period of time the IR detector 204 continues to receive TDM bursts 618, 620 from both IR emitters 108, 202.

A graph 1200 showing the signals 1202, 1208 output from the IR detectors 110, 204 during the scenario presented in FIG. 11 is provided in FIG. 12. As shown in FIG. 12, both IR signals 604, 606 are received at both IR detectors 110, 204 during a first period of time 1202. The first period of time is when the object or person 1102 has not yet caused a beam break to occur.

During a second period of time 1204, the object or person 1102 is in its first position 1106. As such, a beam break occurs in relation to the IR signal 604 emitted from IR emitter 108. In effect, the IR detector 110 only receives the IR signal 606 from IR emitter 202 during the second period of time 1204.

However, the IR detector 204 continues to receive the IR signals 604 and 606 from both IR emitters 108, 202.

During a third period of time 1206, the object or person 1102 is in its second position 1108. As such, a beam break also occurs in relation to the IR signal 606 emitted from IR emitter 202. Consequently, the IR detector 110 does not receive any IR signal 604, 606, and therefore remains in its high static state during the third period of time 1206. Notably, the IR detector 204 receives both IR signals 604, 606 during all periods of time 1202-1206.

The two signals 1202, 1208 are provided from the IR detectors 110, 204 to the system controller 190 for processing. The system controller 190 makes a determination that there is an object or person traveling through the detector side 208 of the EAS detection zone 150 when the signals 1202, 1208 have the beam break patterns shown in FIG. 12, i.e., when (1) the signal 1202 indicates that both IR signals 604, 606 are being received by IR detector 110 during a first period of time, (2) the signal 1202 indicates that only the IR signal 606 is being received by IR detector 110 during the second period of time, (3) the signal 1202 indicates that none of the IR signals 604, 606 are being received by IR detector 110 during the third period of time, and (4) the IR signal 1208 indicates that both IR signals 604, 606 are being received by the IR detector 204 during all three periods of time. In some scenarios, the system controller 190 will take subsequent control measures in response to such a determination. The subsequent control measures are the same as or similar to those described above in relation to FIG. 8.

Referring now to FIG. 13, there is provided a schematic illustration that is useful for understanding another scenario in which an object or person 1302 is traveling through the EAS detection zone 150 on the detector side 208. As shown in FIG. 13, the object or person 1302 is traveling in the y direction. Before the person enters the EAS detection zone 150, the two signals output from the IR detectors 110, 204 are the same as that shown in FIG. 6.

Notably, a beam break pattern may indicate that a person or object is located in the detector side when an IR signal emitted from the IR emitter 108 is blocked on IR detector 110 before the IR signal emitted from IR emitter 108 is blocked on IR detector 204. This will become more evident as the discussion progresses.

As the object or person travels into the EAS detection zone 150, the object or person 1302 first causes a beam break in an IR signal 604 emitted from IR emitter 108, but not in the IR signal 606 emitted from IR emitter 202. The beam break is detected by the IR detector 110 and not by the IR detector 204. In effect, the IR detector 110 receives TDM bursts 620 only from the IR emitter 202 during a period of time when the object or person 1302 is in the first position 1306, whereby the IR detector 110 detects the beam break in the IR signal 604 emitted from IR emitter 108. In contrast, the IR detector 204 receives TDM bursts 618, 620 from both the IR emitters 108, 202 during this period of time.

If the object or person 1302 continues to travel into the EAS detection zone 150, then the object or person 1302 will next cause a beam break in the IR signal 606 to be detected by the IR detector 110. At this time, the IR detector 110 does receive TDM bursts 618 from IR emitter 108, but not TDM bursts 620 from IR emitter 202 during a period of time when the object or person 1302 is in the second position 1308, whereby the IR detector 110 detects the beam break in the IR signal 606 emitted from IR emitter 202. Notably, during this period of time the IR detector 204 continues to receive TDM bursts 618, 620 from both IR emitters 108, 202.

A graph 1400 showing the signals 1402, 1408 output from the IR detectors 110, 204 during the scenario presented in FIG. 13 is provided in FIG. 14. As shown in FIG. 14, both IR signals 604, 606 are received at both IR detectors 110, 204 during a first period of time 1402. The first period of time is when the object or person 1302 has not yet caused a beam break to occur.

During a second period of time 1404, the object or person 1302 is in its first position 1306. As such, a beam break occurs in relation to the IR signal 604 emitted from IR emitter 108. In effect, the IR detector 110 only receives the IR signal 606 from IR emitter 202 during the second period of time 1404. However, the IR detector 204 continues to receive the IR signals 604 and 606 from both IR emitters 108, 202.

During a third period of time 1406, the object or person 1302 is in its second position 1308. As such, a beam break occurs in relation to the IR signal 606 emitted from IR emitter 202. Consequently, the IR detector 110 only receives IR signal 604, and therefore only transitions from its high static state to a low state when bursts 618 are received threat during the third period of time 1406. Notably, the IR detector 204 receives both IR signals 606, 608 during all periods of time 1402-1406.

The two signals 1402, 1408 are provided from the IR detectors 110, 204 to the system controller 190 for processing. The system controller 190 makes a determination that there is an object or person traveling through the detector side 208 of the EAS detection zone 150 when the signals 1402, 1404 have the beam break patterns shown in FIG. 14, i.e., when (1) the signal 1402 indicates that both IR signals 604, 606 are being received by the IR detector 110 during the first period of time, (2) the signal 1402 indicates that only the IR signal 606 is being received by IR detector 110 during the second period of time, (3) the signal 1402 indicates that only the IR signal 604 is being received by IR detector 110 during the third period of time, and (4) the signal 1408 indicates that both IR signals 604, 606 are being received by the IR detector 204 during all three periods of time. In some scenarios, the system controller 190 will take subsequent control measures in response to such a determination. The subsequent control measures are the same as or similar to those described above in relation to FIG. 8.

Referring now to FIG. 15, there is provided a schematic illustration that is useful for understanding a scenario in which an object or person 1502 is traveling through the center 210 of the EAS detection zone 150. As shown in FIG. 15, the object or person 1502 is traveling in the y direction. Before the person enters the EAS detection zone 150, the two signals output from the IR detectors 110, 204 are the same as that shown in FIG. 6.

Notably, a beam break pattern indicates that a person is traveling in the center of the EAS detection zone 150 when both non-adjacent emitters are lost within a short amount of time. This will become more evident as the discussion progresses. Likewise, a beam break pattern may indicate that an object or person is located slightly within the emitter side of the EAS detection zone when an IR signal emitted from the non-adjacent emitter 108 is blocked on IR detector 204 before the IR signal emitted from non-adjacent emitter 202 is blocked on IR detector 110. Similarly, a beam break pattern may indicate that the object or person is located slightly within the detector side of the EAS detection zone when an IR signal emitted from non-adjacent emitter 202 is blocked on IR detector 110 before the IR signal emitted from non-adjacent emitter 108 is blocked on IR detector 204. This will become more evident as the discussion progresses.

As the object or person travels into the EAS detection zone 150, the object or person 1502 first causes a beam break in an IR signal 604 emitted from IR emitter 108, but not in IR signal 606 emitted from IR emitter 202. The beam break is detected by the IR detector 110 and not by the IR detector 204. In effect, the IR detector 110 receives TDM bursts 620 only from the IR emitter 202 during a period of time when the object or person 1502 is in the first position 1506, whereby the IR detector 110 detects the beam break in the IR signal 604 emitted from IR emitter 108. In contrast, the IR detector 204 receives TDM bursts 618, 620 from both the IR emitters 108, 202 during this period of time. Notably, this detection of IR detector 204 has no bearing on this scenario, but has to occur before the object or person 1502 can get to the second position 1508.

If the object or person 1502 continues to travel into the EAS detection zone 150, then the object or person 1502 will next cause a beam break in IR signal 604 to be detected by the IR detector 204. At this time or some time prior to this time, a beam break in IR signal 606 is being detected by IR detector 110. When these events occur concurrently or simultaneously in a relatively short period of time of one another, the object or person is deemed to reside in the center 210 of the EAS detection zone 150.

A graph 1600 showing the signals 1602, 1608 output from the IR detectors 110, 204 during the scenario presented in FIG. 15 is provided in FIG. 16. As shown in FIG. 16, both IR signals 604, 606 are received at both IR detectors 110, 204 during a first period of time 1602. The first period of time is when the object or person 1502 has not yet caused a beam break to occur.

During a second period of time 1604, the object or person 1502 is in its first position 1506. As such, a beam break occurs in relation to the IR signal 604 emitted from IR emitter 108. In effect, the IR detector 110 only receives the IR signal 606 from IR emitter 202 during the second period of time 1604. However, the IR detector 204 continues to receive the IR signals 604 and 606 from both IR emitters 108, 202.

During a third period of time 1606, the object or person 1502 is in its second position 1508. As such, a beam break occurs in relation to both IR signals 604, 606. Consequently, the IR detector 110 only receives IR signal 604 and IR detector 204 only receives IR signal 606.

The two signals 1602, 1608 are provided from the IR detectors 110, 204 to the system controller 190 for processing. The system controller 190 makes a determination that there is an object or person traveling through the center 210 of the EAS detection zone 150 when the signals 1602, 1608 have the beam break patterns shown in FIG. 16, i.e., when (1) the signals 1602, 1608 indicate that both IR signals 604, 606 are being received by the IR detectors 110, 204 during the first period of time, (2) the signal 1602 indicates that only the IR signal 606 is being received by IR detector 110 during the second period of time, (3) the signal 1608 indicates that both IR signals 604, 606 are still being received by the IR detector 204 during the second period of time, (4) the signal 1602 indicates that only the IR signal 604 is being received by IR detector 110 during the third period of time, and (5) the signal 1608 indicates that only IR signal 606 is being received by the IR detector 204 during the third period of time. In some scenarios, the system controller 190 will take subsequent control measures in response to such a determination. The subsequent control measures are the same as or similar to those described above in relation to FIG. 8.

The scenario presented in FIGS. 15-16 occurs when a person is relatively small. However, if a person is relatively large, then the object or person could block different signals at different times than that shown in FIGS. 15-16. For example, with regard to point (2), a blockage of both IR signals 604 and 606 could be detected by IR detector 110 during the second time period as opposed to just IR signal 606, if the object or person is relatively large. In this case, signal 1602 would indicate that IR detector 110 did not receive TDM bursts emitted from either IR emitter 108 and 202 during the second time period.

Figure 17:
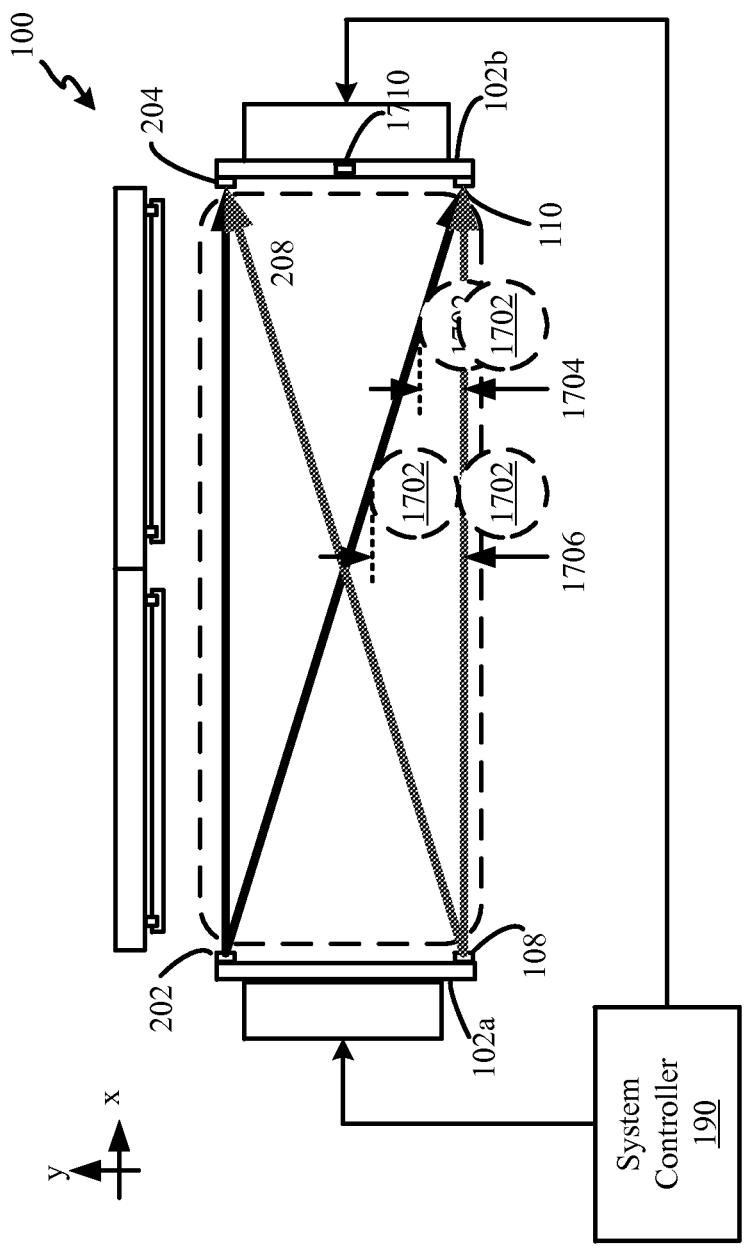
FIG. 17 is a schematic illustration that is useful for understanding the algorithm for determining wherein an object or person is located within an emitter side or a detector side of an EAS detection zone.

Referring now to FIG. 17, there is provided a schematic illustration that is useful for understanding the algorithm for determining where an object or person is located within the emitter side 206 or detector side 208 of the EAS detection zone 150. The timing between changes in the signals output from the IR detectors 110, 204 is used to determine the location of the object or person within the emitter side 206 or detector side 208 of the EAS detection zone 150. By measuring the time difference between signal changes, an estimate can be made as to how far away the object or person is from a given pedestal 102a or 102b. For example, let's assume that a person 1702 is passing through the detector side 208 of the EAS detection zone 150. In this case, the person or object is deemed to be relatively close to the pedestal 102b when a relatively small amount of time 1704 exists between (1) IR detector's 110 detection of a first beam break in the IR signal 604 emitted from IR emitter 108 and (2) IR detector's 110 detection of a second beam break in the IR signal 606 emitted from IR emitter 202. In contrast, the object or person is deemed to be a relatively far from the pedestal 102b when a relatively large amount of time 1706 exists between IR detector's 110 detection of these two beam breaks.

In some scenarios, the algorithm implemented by system controller 190 simply compares the measured time difference 1704 or 1706 with one or more threshold values to determine if the time difference falls within an expected range for a person traveling through the EAS detection zone 150 at a certain distance from the pedestal 102b. The algorithm may select the threshold values based on a detected velocity of the object or person traveling through the EAS detection zone 150. In this regard, a sensor 1710 may be disposed on each pedestal to detect such velocity. Additionally or alternatively, a measured velocity can be obtained from an EAS security tag attached to the object or in the possession of the person. In other scenarios, the algorithm implemented by the system controller 190 uses a matrix that roughly correlates time differential with distance from a pedestal, and with different values depending on the distance between IR detectors 110, 204 and the distance between pedestals 102a, 102b. The beam break data from the previous scenarios may also be used in the matrix as well.

Figure 18:
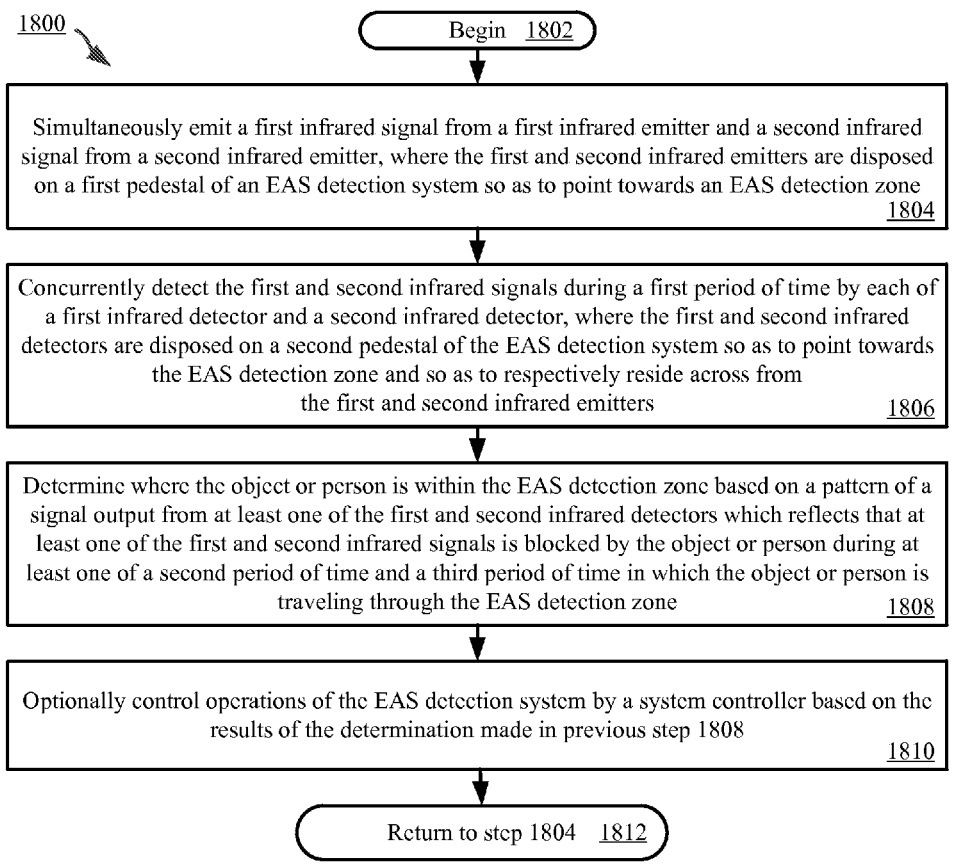
FIG. 18 is a flow diagram of an exemplary method for determining where an object or person is located in an Electronic Article Surveillance EAS detection zone.

Referring now to FIG. 18, there is provided a flow diagram of an exemplary method 1800 for determining where an object or person (e.g., object or person 702 of FIG. 7, 902 of FIG. 9, 1102 of FIG. 11, 1302 of FIG. 13, or 1502 of FIG. 15) is located in an EAS detection zone. The method 1800 begins with step 1802 and continues with step 1804. In step 1804, a first infrared signal (e.g., IR signal 604 of FIG. 6) is emitted from a first infrared emitter (e.g., IR emitter 108 of FIGS. 1-2) and a second infrared signal (e.g., IR signal 606 of FIG. 6) from a second infrared emitter (e.g., IR emitters 202 of FIG. 2). The first and second infrared emitters are disposed on a first pedestal (e.g., pedestal 102a of FIGS. 1-2) of an EAS detection system (e.g., system 100 of FIGS. 1-2) so as to point towards the EAS detection zone (e.g., EAS detection zone 150 of FIG. 2). In some scenarios, the first infrared signal comprises a plurality of first signal bursts having pulse widths which are different than the pulse widths of a plurality of second signal bursts of the second infrared signal. Additionally or alternatively, each of the plurality of first signal bursts is emitted from the first infrared emitter at a different time than when a second signal burst is emitted from the second infrared emitter. As mentioned above, the present invention is not limited to the particulars of these scenarios. Other signaling techniques can be used which employ different modulation frequencies, different wavelengths, different pulse widths and different data stream transmissions.

In a next step 1806, the first and second infrared signals are concurrently detected during a first period of time (e.g., time period 802 of FIG. 8, 1002 of FIG. 10, 1202 of FIG. 12, 1402 of FIG. 14, or 1602 of FIG. 16) by a first infrared detector (e.g., IR detector 110 of FIGS. 1-2) and a second infrared detector (e.g., IR detector 204 of FIG. 2). The first and second infrared detectors are disposed on a second pedestal (e.g., pedestal 102b of FIGS. 1-2) of the EAS detection system so as to point towards the EAS detection zone and so as to respectively reside across from the first and second infrared emitters.

At some later time, a determination is made as to where the object or person is within the EAS detection zone based on a pattern of a signal (e.g., signal 802 of FIG. 8, 808 of FIG. 8, 1002 of FIG. 10, 1008 of FIG. 10, 1202 of FIG. 12, 1208 of FIG. 12, 1402 of FIG. 14, 1408 of FIG. 14, 1602 of FIG. 16, or 1608 of FIG. 16) output from at least one of the first and second infrared detectors which reflects that at least one of the first and second infrared signals is blocked by the object or person during at least one of a second period of time (e.g., time period 804 of FIG. 8, 1004 of FIG. 10, 1204 of FIG. 12, 1404 of FIG. 14, or 1604 of FIG. 16) and a third period of time (e.g., time period 806 of FIG. 8, 1006 of FIG. 10, 1206 of FIG. 12, 1406 of FIG. 14, or 1606 of FIG. 16) in which the object or person is traveling through the EAS detection zone.

In some scenarios, the object or person is determined to be within an area of a plurality of EAS detection zone areas closest to the first and second infrared emitters when: (1) the signal output from the first infrared detector indicates that the first infrared signal is blocked by the object or person during the second and third periods of time; and (2) the signal output from the second infrared detector indicates that the first infrared signal is blocked by the object or person during the third period of time and not the second period of time. Alternatively or additionally, the object or person is determined to be within an area of a plurality of EAS detection zone areas closest to the first and second infrared emitters when: (1) the signal output from the first infrared detector indicates that the first infrared signal is blocked by the object or person during the second period of time and not the third period of time; and (2) the signal output from the second infrared detector indicates that the first infrared signal is blocked by the object or person during the third period of time and not the second period of time.

In those or other scenarios, the object or person is determined to be within an area of a plurality of EAS detection zone areas closest to the first and second infrared detectors when: (1) the signal output from the first infrared detector indicates that the first infrared signal is blocked by the object or person during the second and third period of time, and the second infrared signal is blocked by the object or person during the third period of time and not the second period of time; and (2) the signal output from the second infrared detector indicates that the neither of the first and second infrared signals are blocked by the object or person during the second and third periods of times. Alternatively or additionally, the object or person is determined to be within an area of a plurality of EAS detection zone areas closest to the first and second infrared detectors when: (1) the signal output from the first infrared detector indicates that the first infrared signal is blocked by the object or person during the second period of time and the third infrared signal is blocked by the object or person during the third period of time; and (2) the signal output from the second infrared detector indicates that the neither of the first and second infrared signals are blocked by the object or person during the second and third periods of times.

In those or yet other scenarios, the object or person is determined to be within a center area of the EAS detection zone when: (1) the signal output from the first infrared detector indicates that the first infrared signal is blocked by the object or person during the second period of time and not during the third period of time, and that the third infrared signal is blocked by the object or person during the third period of time and not during the second period of time; and (2) the signal output from the second infrared detector indicates that first infrared signal is blocked by the object or person during the third period of time and not during the second period of time. The location of the object or person within the EAS detection zone may also be determined based on timing differences between signal changes in the signal output from at least one of the first and second infrared detectors.

Upon completing step 1808, step 1810 is performed where a system controller (e.g., system controller 190 of FIG. 2) optionally controls operations of the EAS detection system based on the results of the determination made in previous step 1808. For example, the system controller may perform actions to properly alarm the correct pedestal of the EAS detection system. When a person walks through the EAS detection zone with an activated security tag, both pedestals detect the presence of the activated security tag. In conventional EAS detection systems, visual and/or auditory alarms of both pedestals will issue. This is not desirable in certain situations. Accordingly, in the present invention, the system controller determines whether the person is traveling through the emitter side, center or detector side of the EAS detection zone based on the signals output from the infrared detectors. Based on the results of this determination, the system controller will perform actions to cause only the alarm(s) of the pedestal closest to the person to issue. As a result, the EAS detection system of the present invention provides store personnel with a clear indication of (1) which area of the EAS detection zone the person is walking through, and/or (2) which EAS detection zone of a plurality of adjacent EAS detection zones the person is walking through. In effect, the store personnel can make a more informed decision as to which person of a plurality of people traveling through the EAS detection zone(s) actually has possession of the activated security tag.

Additionally or alternatively, the system controller may use the results of the determination to dynamically modify (e.g., lower) the strength of a pedestal's antenna radiation field. This dynamic modification has certain advantages, such as the conservation of battery power. For example, if the determination indicates that the person is traveling through the emitter side of the EAS detection zone, then the strength of the antenna radiation field emitted from a particular pedestal is dynamically lowered. Similarly, if the determination indicates that the person is traveling through the detector side of the EAS detection zone, then the strength of the antenna radiation field emitted from the particular pedestal is dynamically lowered. If the determination indicates that the person is traveling through the center of the EAS detection zone, then the strength of the antenna radiation field emitted from the pedestals are both changed.

The system controller may also use the result of the determination to prevent alarm issuance if certain conditions are met. For example, let's consider a first scenario in which both pedestals detect a security tag in proximity thereto, but the output signals of the IR detectors indicate that the person is not within the EAS detection zone. In this case, issuance of the pedestals alarms is prevented since the person is likely in the backfield of a pedestal. Let's now consider a second scenario in which both pedestals detect a security tag in proximity thereto, but the output signals of the IR detectors indicate that the person is entering the facility. In this case, issuance of the pedestals alarms is also prevented since it is only desirable to issue alarms in connection with people exiting the facility. The present invention is not limited to the particulars of these two examples.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for determining where an object or person is located in an Electronic Article Surveillance ("EAS") detection zone, comprising:
    simultaneously emitting a first signal from a first emitter and a second signal from a second emitter, where the first and second emitters are positioned so as to point towards the EAS detection zone;
    concurrently detecting the first and second signals during a first period of time by each of a first detector and a second detector, where the first and second detectors are positioned so as to point towards the EAS detection zone and so as to respectively reside across from the first and second emitters;
    determining where the object or person is within the EAS detection zone based on a pattern of a signal output from at least one of the first and second detectors which reflects that at least one of the first and second signals is blocked by the object or person during at least one of a second period of time and a third period of time in which the object or person is traveling through the EAS detection zone; and
    using knowledge of where the object or person is within the EAS detection zone to dynamically change an antenna setting for at least one EAS pedestal.

2. The method according to claim 1, wherein the first signal comprises a plurality of first signal bursts having pulse widths which are different than the pulse widths of a plurality of second signal bursts of the second signal.

3. The method according to claim 2, wherein each of the plurality of first signal bursts is emitted from the first emitter at a different time than when a second signal burst is emitted from the second emitter.

4. The method according to claim 1, wherein the signal output from the first detector transitions from a high state to a low state in response to a reception of a signal burst emitted from the first or second emitters.

5. The method according to claim 1, wherein the object or person is determined to be within an area of a plurality of EAS detection zone areas closest to the first and second emitters when
    (1) the signal output from the first detector indicates that the first signal is blocked by the object or person during the second and third periods of time, and
    (2) the signal output from the second detector indicates that the first signal is blocked by the object or person during the third period of time and not the second period of time.

6. The method according to claim 1, wherein the object or person is determined to be within an area of a plurality of EAS detection zone areas closest to the first and second emitters when
    (1) the signal output from the first detector indicates that the first signal is blocked by the object or person during the second period of time and not the third period of time, and
    (2) the signal output from the second detector indicates that the first signal is blocked by the object or person during the third period of time and not the second period of time.

7. The method according to claim 1, wherein the object or person is determined to be within an area of a plurality of EAS detection zone areas closest to the first and second detectors when
    (1) the signal output from the first detector indicates that the first signal is blocked by the object or person during the second and third period of time, and the second signal is blocked by the object or person during the third period of time and not the second period of time, and
    (2) the signal output from the second detector indicates that the neither of the first and second signals are blocked by the object or person during the second and third periods of times.

8. The method according to claim 1, wherein the object or person is determined to be within an area of a plurality of EAS detection zone areas closest to the first and second detectors when
    (1) the signal output from the first detector indicates that the first signal is blocked by the object or person during the second period of time and the second signal is blocked by the object or person during the third period of time, and
    (2) the signal output from the second detector indicates that neither of the first and second signals are blocked by the object or person during the second and third periods of times.

9. The method according to claim 1, wherein the object or person is determined to be within a center area of the EAS detection zone when
    (1) the signal output from the first detector indicates that the second signal is blocked by the object or person, and
    (2) the signal output from the second detector concurrently indicates that the first signal is blocked by the object or person.

10. The method according to claim 1, wherein a location of the object or person within a first side or a second opposing side of the EAS detection zone is determined based on a timing difference between one of the first and second detector's detection of a first beam break in the first signal emitted from the first emitter and the one of the first and second detector's detection of a second beam break in the second signal emitted from the second emitter.

11. An Electronic Article Surveillance ("EAS") detection system, comprising:
first and second pedestals defining an EAS detection zone therebetween;
first and second emitters simultaneously and respectively emitting first and second signals therefrom, where the first and second emitters are disposed on the first pedestal of the EAS detection system so as to point towards the EAS detection zone;
first and second detectors concurrently detecting the first and second signals during a first period of time, where the first and second detectors are disposed on the second pedestal of the EAS detection system so as to point towards the EAS detection zone and so as to respectively reside across from the first and second emitters; and
an electronic circuit
determining where the object or person is within the EAS detection zone based on a pattern of a signal output from at least one of the first and second detectors which reflects that at least one of the first and second signals is blocked by the object or person during at least one of a second period of time and a third period of time in which the object or person is traveling through the EAS detection zone, and
using knowledge of where the object or person is within the EAS detection zone to dynamically change an antenna setting for at least one EAS pedestal.

12. The EAS system according to claim 11, wherein the first signal comprises a plurality of first signal bursts having pulse widths which are different than the pulse widths of a plurality of second signal bursts of the second signal.

13. The EAS system according to claim 12, wherein each of the plurality of first signal bursts is emitted from the first emitter at a different time than when a second signal burst is emitted from the second emitter.

14. The EAS system according to claim 11, wherein the signal output from the first detector transitions from a high state to a low state in response to a reception of a signal burst emitted from the first or second emitters.

15. The EAS system according to claim 11, wherein the object or person is determined to be within an area of a plurality of EAS detection zone areas closest to the first and second emitters when
(1) the signal output from the first detector indicates that the first signal is blocked by the object or person during the second and third periods of time, and
(2) the signal output from the second detector indicates that the first signal is blocked by the object or person during the third period of time and not the second period of time.

16. The EAS system according to claim 11, wherein the object or person is determined to be within an area of a plurality of EAS detection zone areas closest to the first and second emitters when
(1) the signal output from the first detector indicates that the first signal is blocked by the object or person during the second period of time and not the third period of time, and
(2) the signal output from the second detector indicates that the first signal is blocked by the object or person during the third period of time and not the second period of time.

17. The EAS system according to claim 11, wherein the object or person is determined to be within an area of a plurality of EAS detection zone areas closest to the first and second detectors when
(1) the signal output from the first detector indicates that the first signal is blocked by the object or person during the second and third period of time, and the second signal is blocked by the object or person during the third period of time and not the second period of time, and
(2) the signal output from the second detector indicates that the neither of the first and second signals are blocked by the object or person during the second and third periods of times.

18. The EAS system according to claim 11, wherein the object or person is determined to be within an area of a plurality of EAS detection zone areas closest to the first and second detectors when
(1) the signal output from the first detector indicates that the first signal is blocked by the object or person during the second period of time and the second signal is blocked by the object or person during the third period of time, and
(2) the signal output from the second detector indicates that the neither of the first and second signals are blocked by the object or person during the second and third periods of times.

19. The EAS system according to claim 11, wherein the object or person is determined to be within a center area of the EAS detection zone when
(1) the signal output from the first detector indicates that the second signal is blocked by the object or person, and
(2) the signal output from the second detector concurrently indicates that first signal is blocked by the object or person.

20. An Electronic Article Surveillance ("EAS") detection system, comprising:
at least a first pedestal defining an EAS detection zone;
first and second emitters simultaneously and respectively emitting first and second signals therefrom, where the first and second emitters are positioned so as to point towards the EAS detection zone;
first and second detectors concurrently detecting the first and second signals during a first period of time, where the first and second detectors are positioned so as to point towards the EAS detection zone and so as to respectively reside across from the first and second emitters; and
an electronic circuit
determining in which portion of the EAS detection zone the object or person is located based on
(1) a pattern of a signal output from at least one of the first and second detectors which reflects that at least one of the first and second signals is blocked by the object or person during at least one of a second period of time and a third period of time in which the object or person is traveling through the EAS detection zone, and
(2) a timing difference between one of the first and second detector's detection of a first beam break in the first signal emitted from the first emitter and the one of the first and second detector's detection of a second beam break in the second signal emitted from the second emitter.

* * * * *